United States Patent [19]

Kim

[11] Patent Number: 5,667,172
[45] Date of Patent: Sep. 16, 1997

[54] GARMENT BAG

[75] Inventor: Young S. Kim, Los Altos, Calif.

[73] Assignee: Inno Design, Inc., Sunnyvale, Calif.

[21] Appl. No.: 399,736

[22] Filed: Mar. 7, 1995

Related U.S. Application Data

[63] Continuation-in-part of Ser. No. 212,002, Mar. 11, 1994, which is a continuation-in-part of Ser. No. 41,769, Apr. 2, 1993, abandoned, which is a continuation-in-part of Ser. No. 890,717, May 29, 1992, Pat. No. 5,330,141.

[51] Int. Cl.⁶ .................................................. A63B 55/08
[52] U.S. Cl. ........................... 248/98; 190/18 A; 190/122; 206/287.1; 280/651
[58] Field of Search ........................... 248/98, 145.6, 248/129, 370; 280/35, 37, 47.34, 79.7, 651; 190/18 A, 24, 122, 127, 124; 206/287.1

[56] References Cited

U.S. PATENT DOCUMENTS

| | | | |
|---|---|---|---|
| 1,895,677 | 1/1933 | Pinheiro | 206/287.1 X |
| 2,558,909 | 7/1951 | Partiot | 280/37 |
| 2,777,708 | 1/1957 | Patterson | 280/37 |
| 3,329,442 | 7/1967 | Di Vietri | 280/35 |
| 3,871,676 | 3/1975 | Renard et al. | 280/35 |
| 4,588,055 | 5/1986 | Chen | 280/37 X |
| 4,878,682 | 11/1989 | Lee | 280/651 X |
| 5,147,019 | 9/1992 | Van Hooreweder et al. | 280/37 X |
| 5,351,792 | 10/1994 | Cohen | 190/18 A |
| 5,353,900 | 10/1994 | Stilley | 280/37 X |
| 5,522,487 | 6/1996 | Nordstrom | 206/287.1 X |

Primary Examiner—Korie Chan
Attorney, Agent, or Firm—Peninsula IP Group; Douglas A. Chaikin, Esq.

[57] ABSTRACT

Disclosed herein in a garment bag which folds from a fully folded configuration to a tote configuration and an open configuration. The garment bag has wheels, a lifting mechanism, a linkage assembly, and an actuator. The lifting mechanism includes a shoulder strap. The shoulder strap can pull on the linkage assembly to fold the garment bag from the tote configuration to the fully folded configuration. The wheels facilitate transport of the garment bag when the garment bag is in the tote configuration. The garment bag automatically locks in the fully folded configuration to facilitate carrying of and storage of the garment bag. The actuator is engageable to automatically release the garment bag from the fully folded configuration to the tote configuration.

13 Claims, 10 Drawing Sheets

FIG.—3

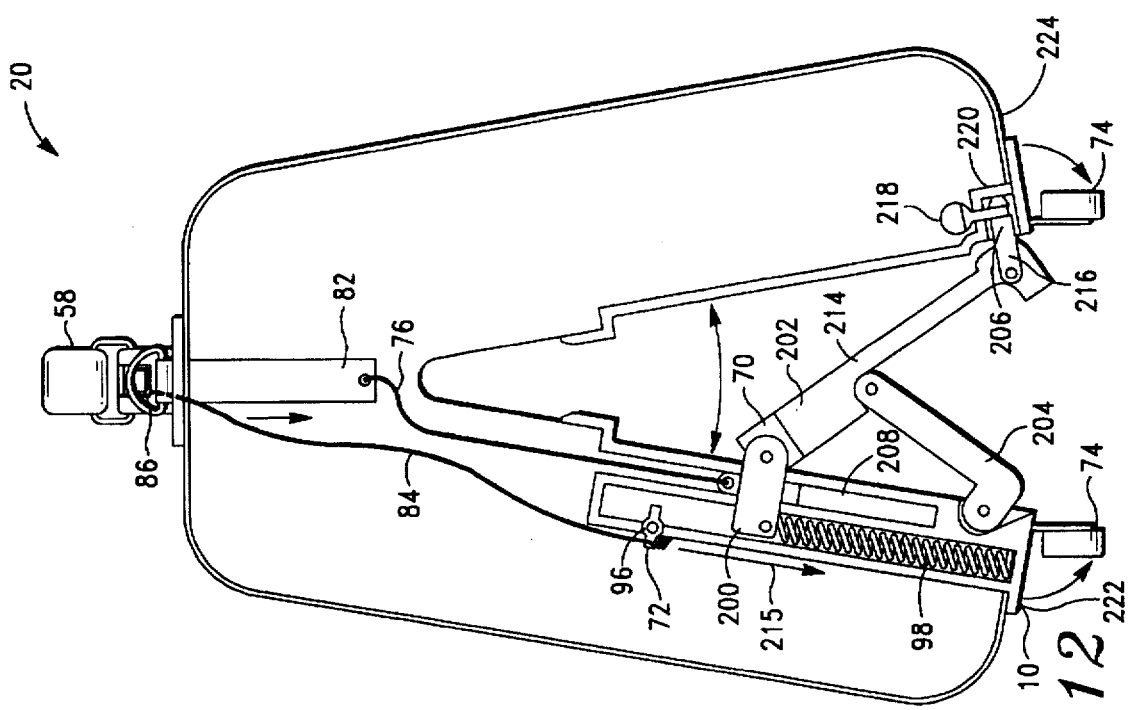
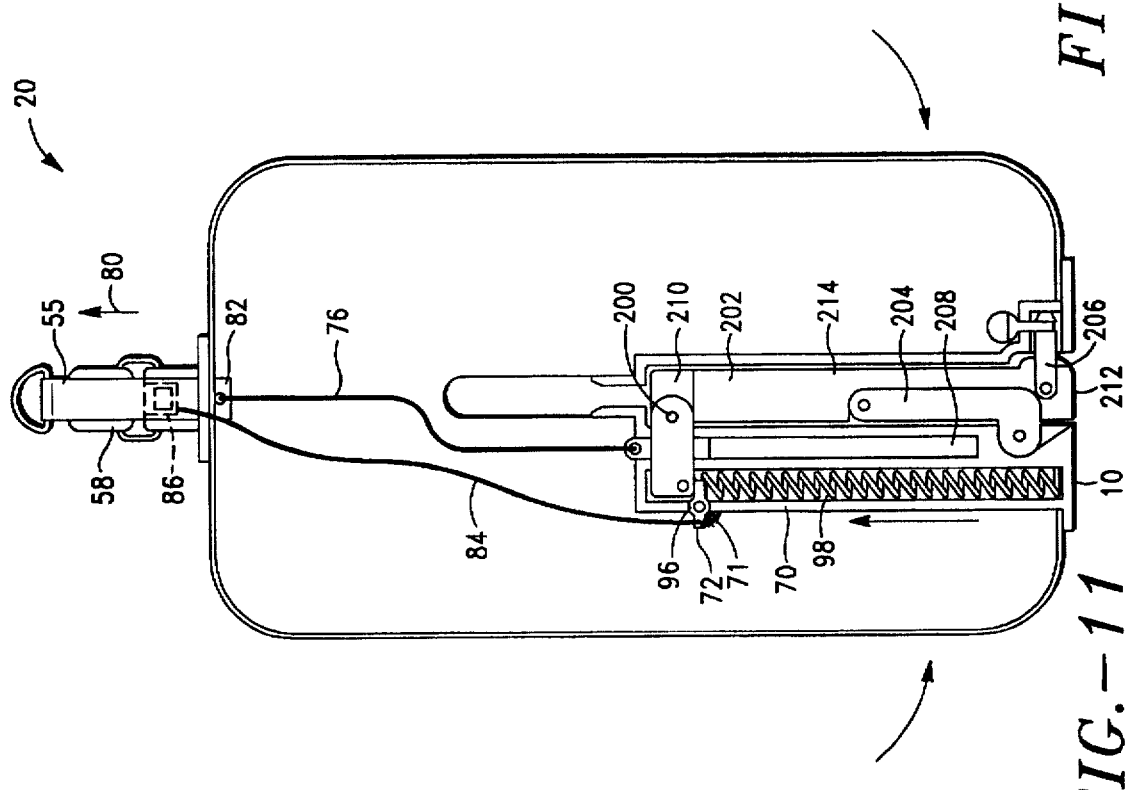

GARMENT BAG

CROSS REFERENCE TO RELATED PATENT APPLICATIONS

This application is a continuation-in-part of pending U.S. Patent Application Ser. No. 08/212,002 filed Mar. 11, 1994; which is a continuation-in-part of U.S. Patent Application Ser. No. 08/041,769, filed Apr. 2, 1993 which is abandoned; which is a continuation-in-part of U.S. Patent Application Ser. No. 07/890,717, filed May 29, 1992 now U.S. Pat. No. 5,330,141.

BACKGROUND OF THE INVENTION

1. Field of the Invention

The present invention relates generally to hand carryable garment bags. More particularly, the present invention relates to folding garment bags which are selectively configurable between an open configuration, an tote configuration and a fully folded configuration.

2. Previous Art

Garment bags include suitbags, suitcases and large handbags. Such garment bags can be heavy and clumsy when carried over long distances. Air travelers who carry garment bags for hundreds of yards between crowded ticketing and boarding areas will often find carrying such garment bags inconvenient.

One type of garment bag folds from an open configuration to a fully folded configuration. In the open configuration, the garment bag lies flat or hangs for packing suits and other clothing into the garment bag or keeping clothing in an unfolded condition. From the open configuration, the garment bag folds into a fully folded configuration for storage and handling. Typically the garment bag has a shoulder strap and handle for carrying the garment bag when the garment bag is in the fully folded configuration. This facilitates in carrying the bag through an airport, for example.

In recent years there has been a significant development to luggage carriers, namely luggage carriers with wheels. Typically at least a pair of wheels attaches to a piece of luggage. Samsonite Inc. has introduced a garment bag which includes a resilient internal frame reinforces the garment bag and biases the garment bag in an open configuration. This type of garment bag can be compressed and folded. From the open configuration, the garment bag can be folded into an tote configuration so that the garment bag can be wheeled and into a fully folded configuration for storage and carrying. In the tote configuration, the wheels can contact and roll along the ground. A hand actuatable latch on a fixed strap holds the two ends of the garment bag together. In this way, the tote configuration is maintained. From the tote configuration, the garment bag can be folded into the fully folded configuration to facilitate carrying. This requires the bag to be compressed. The latch is detached from the end of the bag and reattached at another attachment point such as on a lateral side of the bag. A garment bag in the fully folded configuration is more easily stowed than a bag in an open or tote configuration.

Unfortunately, compressing the garment bag from the tote configuration into the fully folded configuration and vice versa is awkward. This can require physically compressing the garment bag, unlatching the garment bag latch from the tote configuration and relatching the garment bag in the fully folded configuration. Often, a traveler attempts to use both arms to compress the garment bag. Without a free hand, detaching and reattaching the latch is difficult. Alternatively, the garment bag can be wedged against a wall or the floor to free one hand of the traveler. The free hand can then detach and reattach the latch. Repetitively latching and unlatching a garment bag, especially when moving from an airliner, through a crowded air terminal and into ground transportation for example, can be time consuming and awkward. What is desired is a garment bag which conveniently folds to ease transport and storage of the garment bag.

Some garment bags of the past fail to hold a sufficient volume of garments to clothe a week long traveler. These smaller garment bags are light weight even when loaded and do not have sufficient weight to justify providing wheels. The marketplace, however, demands that garment bags have sufficient capacity for a week long traveler. What is desired is a garment bag having a capacity to store the luggage of a week long traveler.

To meet the demands of a week long traveler, large capacity garment bags are provided. Unfortunately, many of the large capacity garment bags are too large in size to fit in an overhead storage bin of a passenger aircraft. These large capacity garment bags are inconvenient for modern air travel. What is desired is a large capacity garment bag which has wheels to ease transport and is configurable to fit in overhead storage bins such as provided in most passenger aircraft.

SUMMARY OF THE INVENTION

Accordingly, it is an object of the present invention to provide a garment bag which is configurable to fits into overhead storage bins such as those typically provided on passenger aircraft so that the garment bag is conveniently transportable.

It is another object to provide a garment bag which automatically folds to ease transport.

It is another object to provide a folding garment bag which conveniently folds from an open configuration for packing to an tote configuration for wheeling, to a fully folded configuration for storage.

In accordance with the above objects and those that will be mentioned and become apparent below, a garment bag comprises:

a garment bag being foldable between a tote configuration and a fully folded configuration;

a lifting mechanism moveably attached to the garment bag, the lifting mechanism being capable of lifting the garment bag and folding the garment bag from the tote configuration to the fully folded configuration; and a linkage assembly having one end attached to the lifting mechanism and another end attached to the garment bag, whereby, when the lifting mechanism lifts the garment bag, one end of the lifting mechanism actuates the linkage assembly to fold the garment bag from the tote configuration into the fully folded configuration.

In a preferred embodiment, the garment bag has two ends. The linkage assembly includes a release. The garment bag being capable of flexing from the tote configuration into an open configuration. The release releasably holds the two ends of the garment bag to permit the garment bag to flex into the open configuration.

In another preferred embodiment, the lifting mechanism slidably attaches to the garment bag.

In another preferred embodiment, the garment bag includes wheels. The wheels being partially concealed by the garment bag when the garment bag is in the fully folded configuration.

In another preferred embodiment, the wheels are hidden for compact storage when the garment bag is in the fully folded configuration. The wheels are extendible when the garment bag is in the tote configuration. The linkage assembly extends the wheels from when the garment bag folds from the fully folded configuration to the tote configuration to facilitate wheeling the garment bag.

In another preferred embodiment, the linkage assembly includes a sliding member, a cable and a spring. The cable attaches the sliding member to the lifting mechanism. The spring attaches the sliding member to the garment bag to bias the garment bag in the tote configuration.

In another preferred embodiment, the lock mechanism cable includes an actuator, a lock cable and a spring biased pawl latch. The pawl latch is engageable with the linkage assembly. The actuator is selectively actuatable to selectively actuate the pawl latch to release the garment bag from the fully folded configuration to the tote configuration.

In another preferred embodiment, the linkage assembly includes a sliding member, a rotatable member, a transverse member having two ends and a middle portion, and a release. The sliding member attaches to one end of the transverse member. The rotatable member attaches to the middle portion of the transverse member. The release attaches to the other end of the transverse member.

In another preferred embodiment, the linkage assembly includes a release. The release is manually actuatable and includes a pin and a tab. The garment bag defines a connector. The pin removeably pokes into the connector of the garment bag, the tab selectively locks the pin with the connector. In a variation of this embodiment, the tab is manually moveable to unlock the pin. The pin being configured to selectively withdraw from the connector, the linkage assembly is foldable. When the pin withdraws from the connector, the linkage assembly folds.

In another preferred embodiment, the garment bag has a handle and a lock mechanism. The lock mechanism selectively actuates the linkage mechanism to unfold the garment bag from the fully folded configuration to the tote configuration.

It is an advantage of the present invention to provide a garment bag which folds into a fully folded configuration to facilitate stowage in an overhead storage bin of a typical passenger airliner.

It is another advantage of the invention to provide a garment bag which automatically locks in a fully folded configuration.

It is another advantage of the invention to provide a garment bag with wheels and a lifting mechanism where the wheels of the garment bag facilitate transport of the garment bag and the lifting mechanism facilitates folding the garment bag from the tote configuration to the fully folded configuration for storage.

The foregoing objects, advantages and features of the invention and those which will be apparent below can be better appreciated after review of the following detailed description of the invention in which like parts have like reference numerals, taken together with the drawing figures, in which:

BRIEF DESCRIPTION OF THE DRAWINGS

FIG. 11 is a cutaway side view of the garment bag of FIG. 9 in a fully folded configuration as seen along the line 11—11 in FIG. 9 in the direction of the arrows.

FIG. 12 is cutaway side view of the garment bag of FIG. 9 in an tote configuration as seen along the line 11—11 in FIG. 9 in the direction of the arrows.

DETAILED DESCRIPTION OF THE INVENTION

Figure 1:
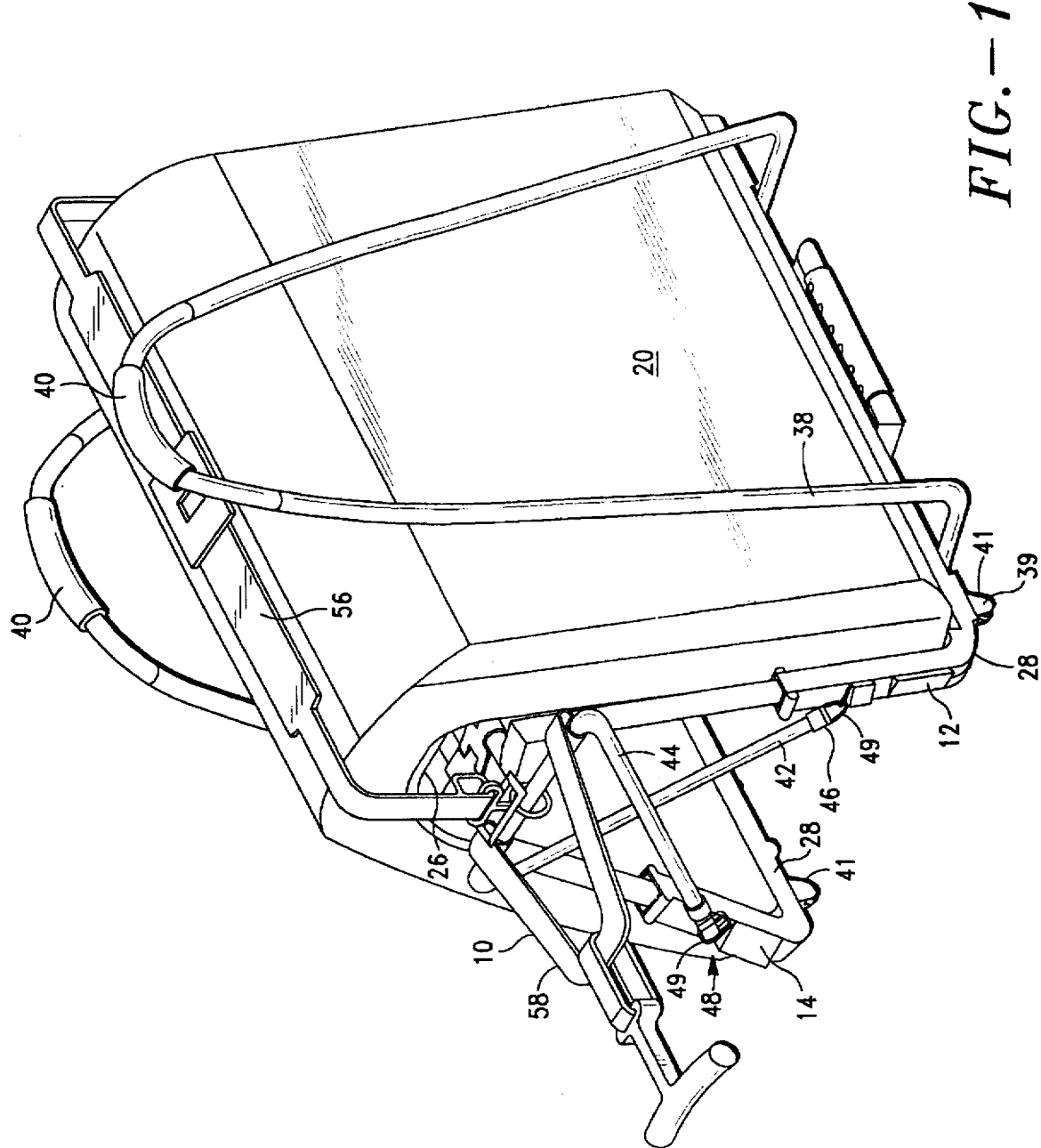
FIG. 1 is an elevated view of a garment bag in accordance with the invention in an tote configuration.

With particular reference to FIG. 1, there is shown a garment bag 20 and a luggage cart 10. The luggage cart 10 is formed from two frame members 12 and 14. The garment bag 20 is fastened to the frame members 12 and 14. The garment bag 20 has a fold 26 and is partially folded in a tote configuration. The garment bag 20 folds to facilitate placement of the garment bag 20 into a storage bin such as an overhead storage bin of a typical passenger aircraft.

Figure 2:
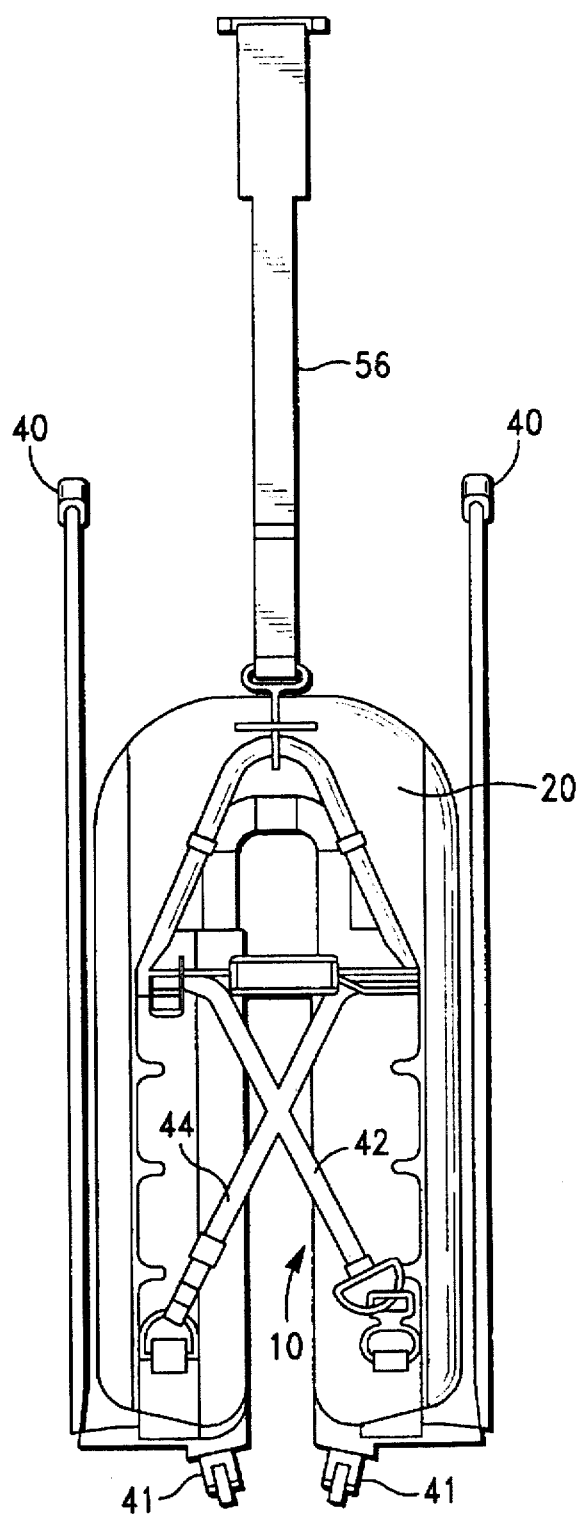
FIG. 2 is an end view of the garment bag of FIG. 1 in a fully folded configuration for carrying in a conventional manner by a lifting mechanism.

With particular reference to FIG. 2, there is shown the garment bag 20. The garment bag 20 includes a luggage cart generally indicated by the reference numeral 10, and a lifting mechanism 56. The luggage cart 10 has handles 40, wheels 41 and cables 42 and 44. The garment bag 20 and the luggage cart 10 are in a fully folded configuration. The wheels 41 attach to the luggage cart 10 at an angle with respect to each offset when the luggage cart 10 is in the fully folded configuration.

Figure 3:
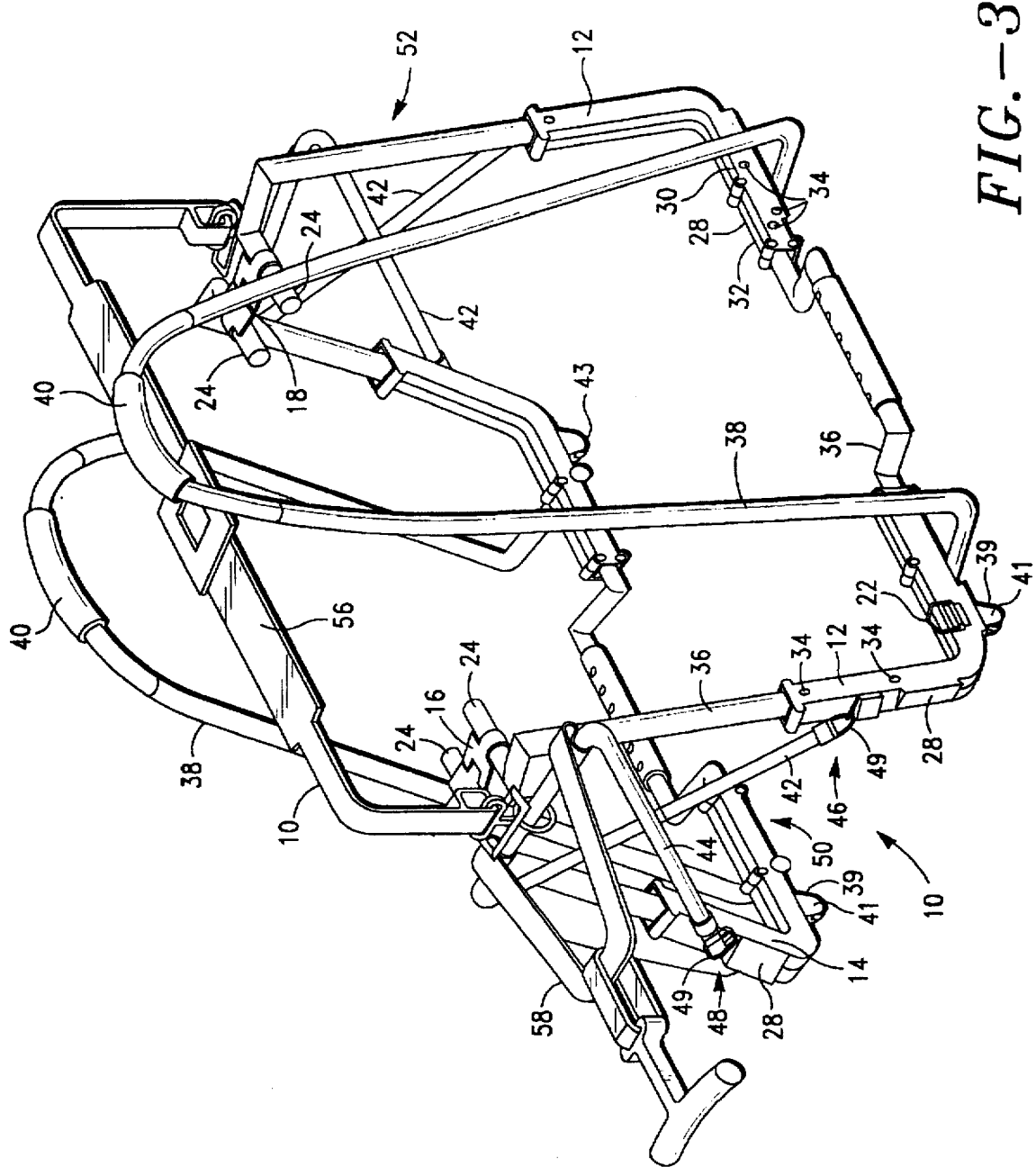
FIG. 3 is a perspective view of the frame members of FIGS. 1–2.

With particular reference to FIG. 3, there is shown the luggage cart 10. The luggage cart 10 is in a tote configuration. The luggage cart 10 has wheels 41 and 43, fasteners 22, projections 24, halves 30 and 32, corner pieces 28, support rods 36, handle cables 38, plastic sheaths 39, handles 40 and cables 42 and 44.

Frame members 12 and 14 are attachable to a garment bag by fasteners 22. Opposing projections 24 are extendible into the fold 26 of the garment bag 20 (FIG. 1) to secure the garment bag 20 on the frame members 12 and 14. The projections 24 are appropriately spaced to permit the garment bag 20 to fold. The frame members 12 and 14 are pivotally connected with each other at 16 and 18 to facilitate folding of the luggage cart 10 from the tote configuration to the fully folded configuration (FIG. 2).

The frame members 12 and 14 include the L-shaped corner pieces 28. Each corner piece 28 is formed from the halves 30 and 32. The halves 30 and 32 are joined together with fasteners 34. The corner pieces 28 clamp around the support rods 36. The support rods 36 terminate in the projections 24. The handle cables 38 are formed from flexible material such as plastic or Nylon extend from halves 32 of the corner pieces 28. The wheels 41 are partially enclosed in plastic sheaths 39 to give them sufficient rigidity to stand in the configuration shown without additional support.

Handles 40 are provided at the top of handle cables 38 for carrying the luggage cart 10 and garment bag 20 when the garment bag is in the fully folded configuration (FIG. 2). Swivelable front wheels 41 and non-swivelable rear wheels 43 are provided on the bottom of the corner pieces 28 and are canted as shown in FIG. 2, so that the wheels 41 and 43 are vertically oriented when the luggage cart is partially open i.e. occupies a tote configuration as seen in FIGS. 1 and 3.

A crossed flexible cable 42 is formed from a flexible plastic, such as Nylon. Each cable 42 connects to the frame members 12 and 14 at 46 and 48 near the bottom of the frame members 12 and 14 by means of D-rings 49 and by means of tubes 51 near the top of the frame members 12 and 14 at front 50 and back 52 of the luggage cart 10. Each cable 42 connects to a lifting mechanism 56 such as a strap or a handle mechanism. A handle 58 pivotally connects to the support rods 36.

The garment bag 20 unfolds from the fully folded configuration shown in FIG. 2 to the tote configuration (FIG. 1) by placing the luggage cart 10 on the ground and pressing down on the top of the garment bag 20 or pulling up on the handles 40. Pressing down on the garment bag 20 exerts a force having an outward component at the bottom of the frame members 12 and 14. When the handles 40 are pulled upwards, the bottoms of the frame members 12 and 14 tend to pivot outward. With the garment bag 20 in the tote configuration shown in FIG. 1, the garment bag 20 cart can be wheeled behind a traveler, for example, by pulling on the handle 58.

When it is desired to store or stow the garment bag 20, the user pulls up on the lifting mechanism 56, which causes the crossed cable 42 to move in a manner similar to shoe laces to pull the frame members 12 and 14 toward one another at their bottom, making the frame members 12 and 14 substantially parallel to one another, as shown in FIG. 2. Friction between the cable 42 and the frame members 12 and 14 will tend to keep the frame members 12 and 14 in this orientation, but the lifting mechanism 56 could also be shortened or a suitable fastener could be provided, either engaging the lifting mechanism 56 or fastening the frame members 12 and 14 together at their bottom. The garment bag 20 is carryable by the lifting mechanism 56 and by the handles 40.

Figure 4:
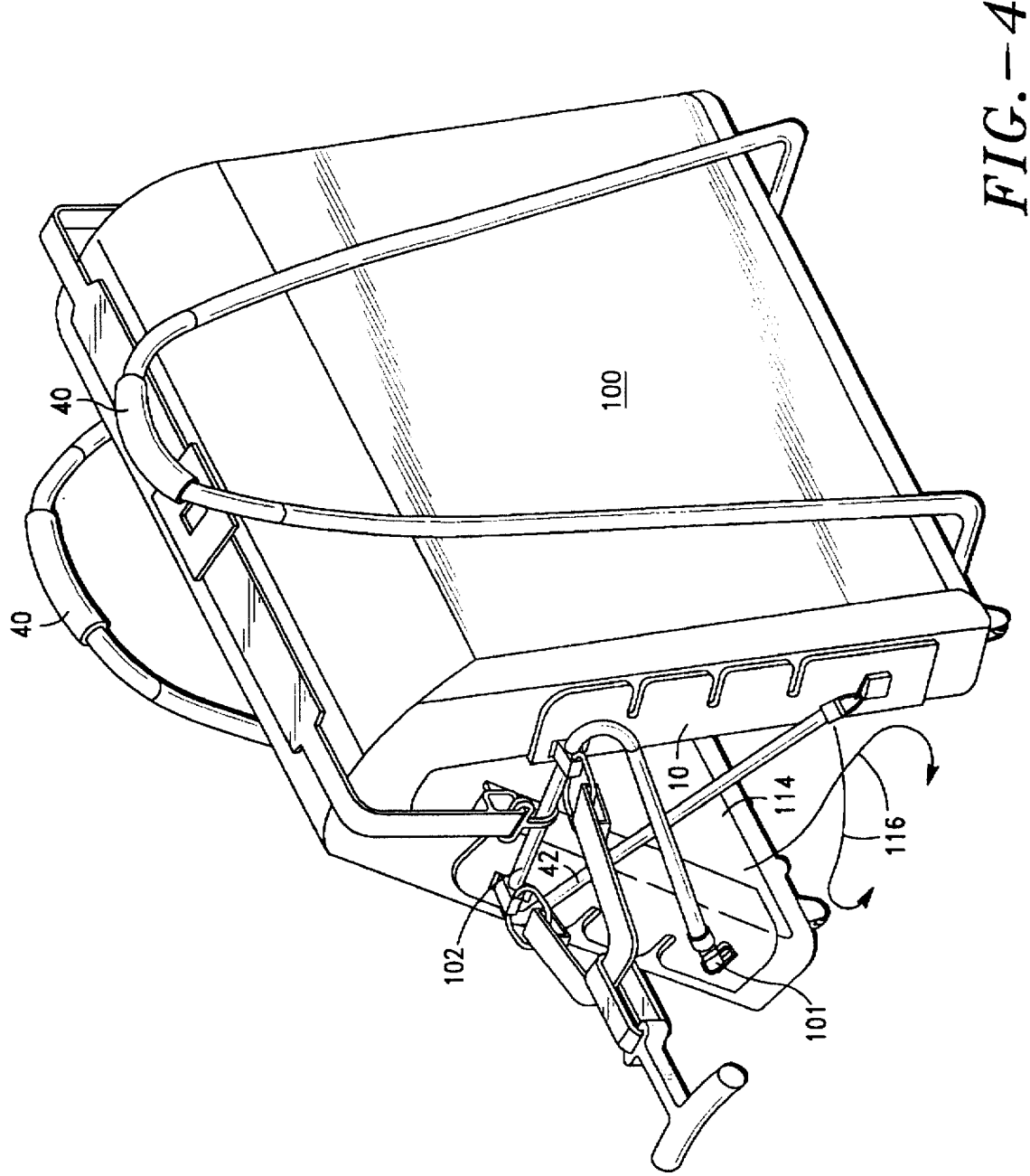
FIG. 4 is a perspective view of a garment bag in accordance with the invention in an tote configuration for wheeled transport.

With particular reference to FIG. 4, there is shown a garment bag 100 and a frame structure 102. The garment bag 100 occupies the tote configuration. The frame structure 102 includes crossed cables 42 and handles 40. The crossed cables 42 have one end 101 which is removeably attached to the frame structure 102. Each end 101 is unhooked as indicated by arrows 116 to unfold the garment bag 100 from the tote configuration shown to the open configuration.

Figure 5:
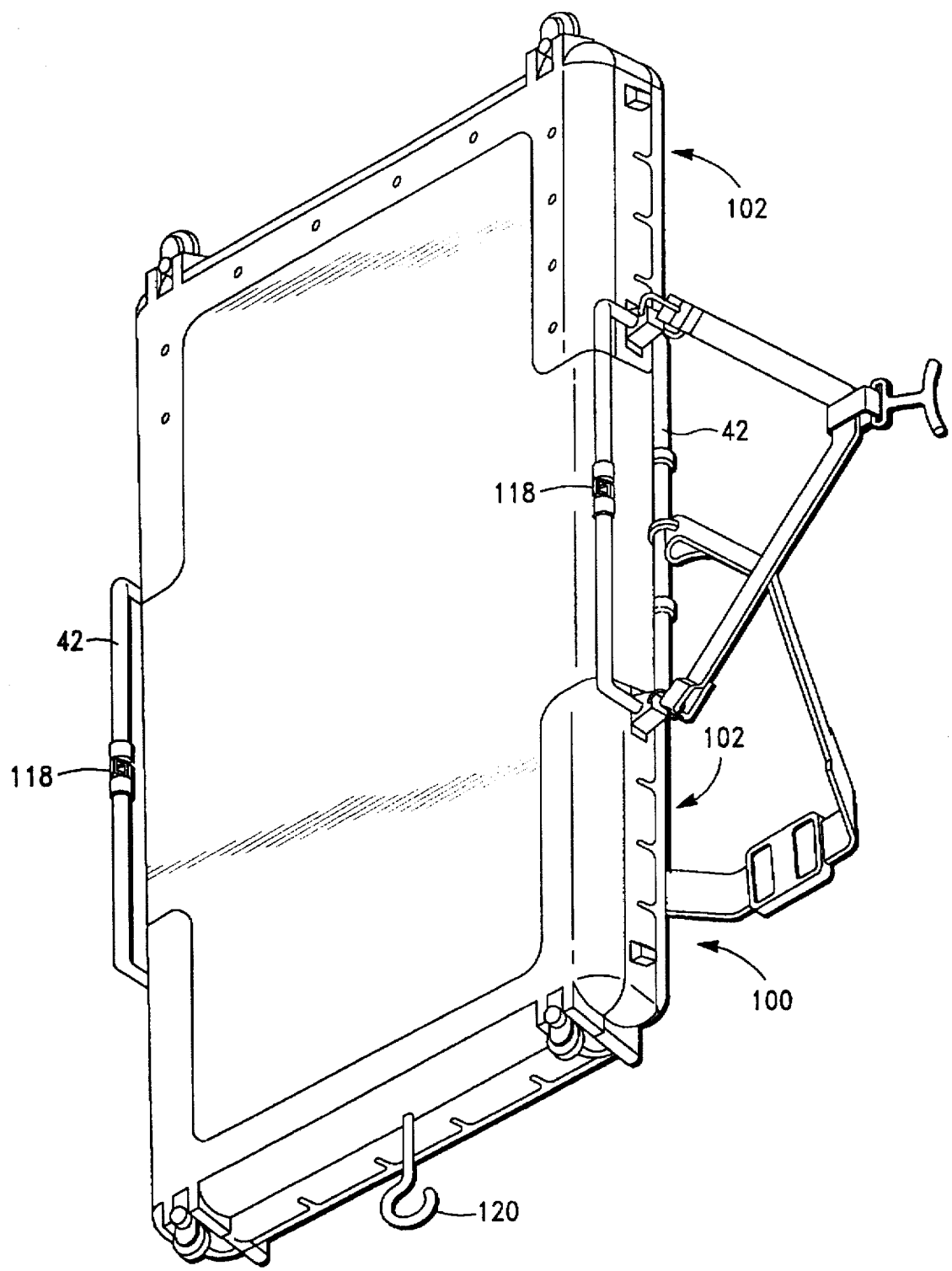
FIG. 5 is a perspective view of the garment bag of FIGS. 4 in an open configuration for hanging in a closet and for packing and unpacking.

With particular reference to FIG. 5, there is shown the garment bag 100 and frame structure 102 in the open configuration. The garment bag 100 has a hanging hook 120. The crossed cables 42 are hooked together at 118 to form a loop to maintain the garment bag 100 and frame structure 102 into the open configuration. The garment bag 100 can be hung by the hook 120.

Figure 6:
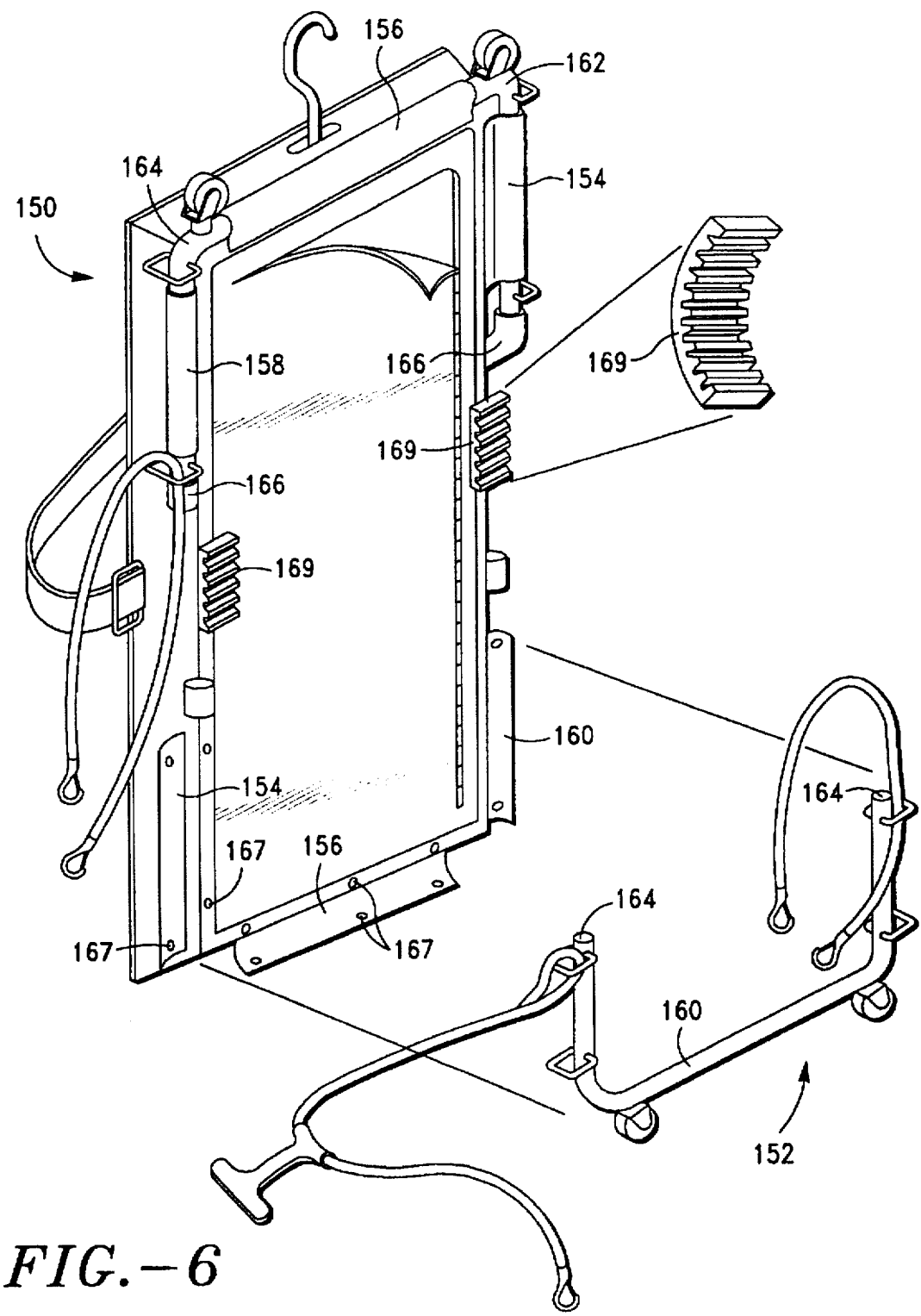
FIG. 6 is an exploded perspective view of a garment bag in accordance with the present invention with an enlarged view of a hinge.

With particular reference to FIG. 6 there is shown a garment bag generally designated with the reference numeral 150 in an open configuration. The garment bag has a luggage cart structure 152. The luggage cart structure 152 is removable from the garment bag 150. The garment bag 150 has two sets of flaps 154, 156 and 158. The luggage cart structure 152 has respective frame members 160 and 162, pockets 166 and ends 164. Each flap 154, 156, and 158 fit attaches over the respective frame members 160 and 162.

Figure 7:
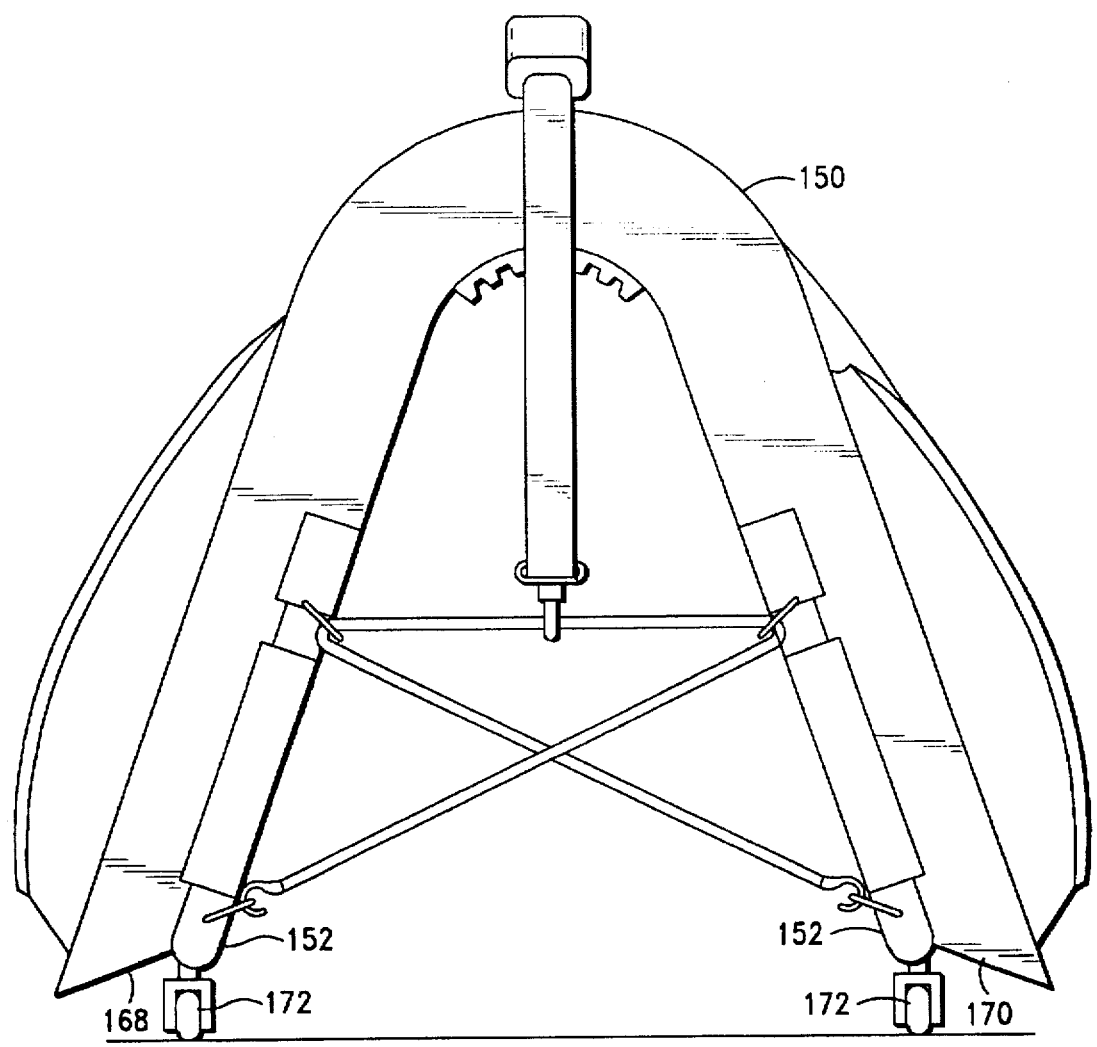
FIG. 7 is an end view of the garment bag of FIG. 6 in an tote configuration.

The ends 164 insert into covering pockets 166 to hold the frame members 160 and 162. The flaps 154, 156 and 158 removeably attach to the frame members 160 and 162 by fasteners such as snaps 167, Velcro® strips or other suitable fasteners. Rubber or other suitable elastomeric material hinges 169 on the garment bag 150 bias the garment bag 150 into the transport configuration (FIG. 7). When it is desired to carry the garment bag 150, without the luggage cart structure 152, the frame members 160 and 162 are removed from the flaps 154, 156 and 158.

With particular reference to FIGS. 7 there is shown the garment bag 150. The garment bag 150 includes wheels 172 and ends 168 and 170. The ends 168 and 170 of the garment bag 152 are angled in a tapered fashion, so that wheels 172 are extend from garment bag 20 for wheeled transport.

Figure 8:
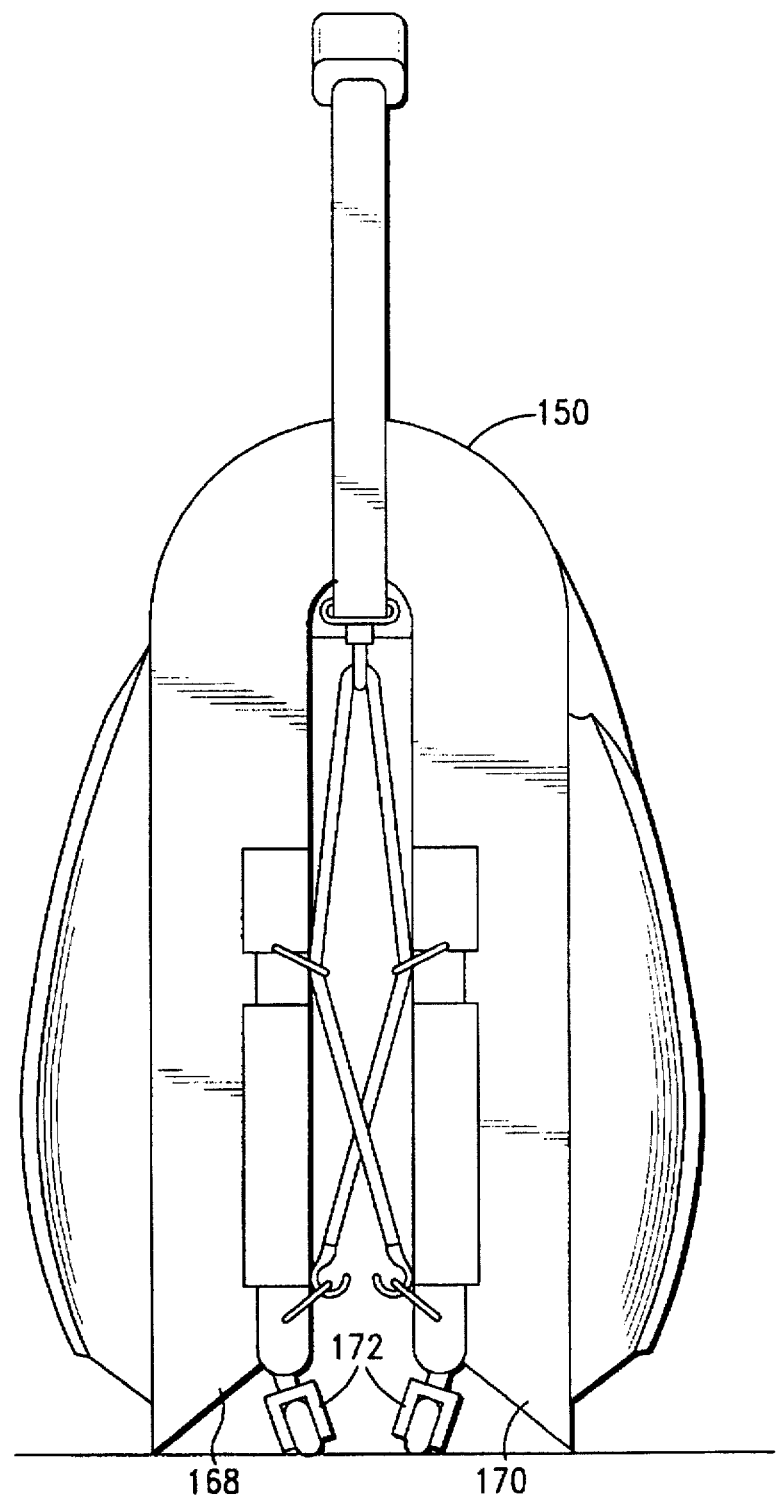
FIG. 8 is an end view of the garment bag of FIG. 6 in a fully folded configuration.

With particular reference to FIG. 8, there is shown the garment bag 150. The wheels 172 are hidden within the tapered ends 168 and 170 to facilitate storage of the garment bag 150.

Figure 9:
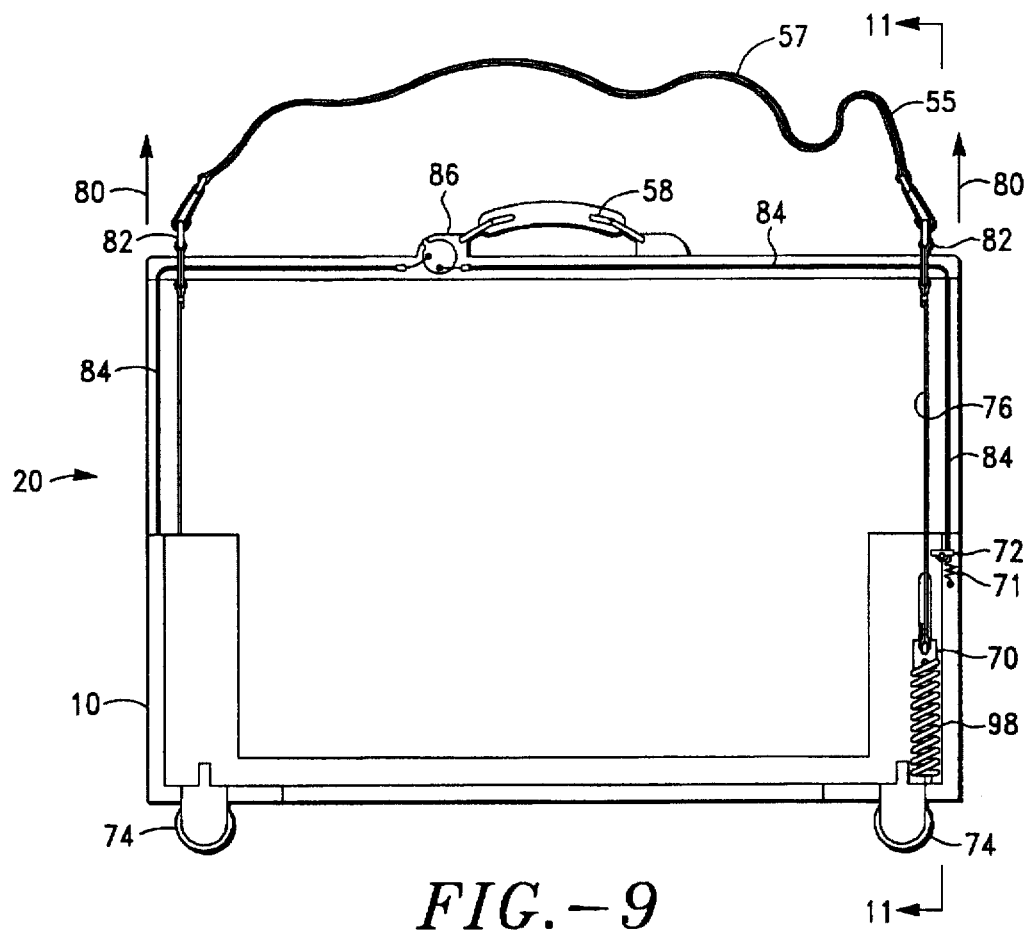
FIG. 9 is a partial cutaway side view of a garment bag in accordance with the present invention.

With particular reference to FIG. 9, there is shown a garment bag generally designated with the reference numeral 20. The garment bag 20 has a lifting mechanism 55, a handle 58, a linkage assembly 70 having a cable 76, a lock assembly 72, and wheels 74.

The lifting mechanism 55 includes a strap 57 which attaches to the garment bag 20. The lifting mechanism 55 is flexible and has two ends 82. The ends 82 of the lifting mechanism 55 slide perpendicularly with respect to the garment bag 20 in the direction of the arrows 80.

The linkage assembly 70 has a spring 98. The cable 76 has an end attached to the end 82 of the lifting mechanism 55 and another end attached to the spring 98. It can be appreciated that when the lifting mechanism 55 is pulled in the direction of the arrow 80, the end 82 of the lifting mechanism pulls against the cable 76 and the cable 76 pulls against the spring 98 to actuate the linkage assembly 70.

The wheels 74 attach to the garment bag 20 in a position opposing the lifting mechanism 55. The wheels 74 extend from the garment bag 20 in an operational configuration. It can be appreciated that a hook can attach to the garment bag 20 adjacent the wheels for hanging the garment bag 20 in the open configuration (FIGS. 5 and 6).

The handle 58 attaches to the garment bag 20 and opposes the wheels 74. The locking mechanism 72 attaches to the garment bag adjacent the linkage assembly 70. The locking mechanism 72 includes a lock cable 84, a spring 71 and an actuator 86. The actuator attaches 86 to the garment bag 20 adjacent the handle 58. The lock cable 84 extends from the actuator 86 to the linkage assembly 70. The actuator 86 is rotatable for tensioning the lock cable 84 and locking the linkage assembly 70. The spring 71 biases the locking mechanism 72 in an operable position.

Figure 10:
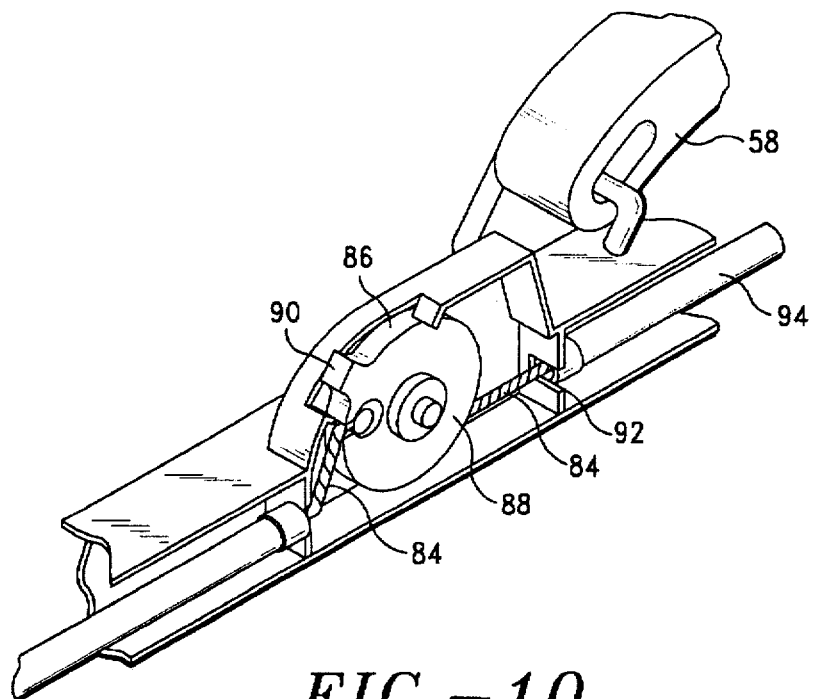
FIG. 10 is a perspective cutaway view of the actuator of FIG. 9.

With particular reference to FIG. 10, there is shown the actuator 86 of FIG. 9. The actuator 86 has a flat rotatable switch 88. The switch 88 has a ridge 90. Pressure applied to the ridge 90 rotates the flat switch 88. A pair of lock cables 84 attach to opposing sides of the actuator 86. When the flat switch 88 rotates, the flat switch 88 selectively tensions the cables 84. Although a rotatable actuator is shown, it can be appreciated that the actuator can be any of a variety of suitable actuators including a linearly moveable switch or button in accordance with the present invention.

Each cable 84 is flexible and has an inner wire 92 and a coaxial outer sleeve 94. The inner wire 92 slides independently of the outer sleeve 94. The cables 84 can operate when flexed to permit the cable to extend from the actuator 86 to the linkage assembly 70 along a curved path.

With particular reference to FIG. 11, there is shown the garment bag 20 in a fully folded configuration. The end 82 of the lifting mechanism is extended in the direction of the arrow 80 to pull the cable 76. The cable 76 is a flexible coaxial cable having an inner wire and an outer coaxial sleeve. The cable 76 can be fabricated from the same material as the cables 84.

The linkage assembly 70 includes the spring 98; a sliding member 200; a transverse member 202 having one end 210, another end 212 and a middle portion 214; a rotatable member 204; and a release 206. The sliding member 200 attaches to one end 210 of the transverse member 202. The rotatable member 204 attaches to the middle portion 214 of the transverse member 202. The release 206 attaches to the other end 212 of the transverse member 202. The rotatable member 204, the release 206, and the sliding member 200 are rigid structural members which rotatably attach to the transverse member 202.

The linkage assembly 70 defines a slot 208. The sliding member 200 slidably attaches within the slot 208. The rotatable member 204 rotatably attaches to the, garment bag 20. The release 206 removeably attaches to the garment bag 20.

The lock mechanism 72 includes the actuator 86, the lock cable 84 and a pawl latch 96. The pawl latch 96 is spring biased by spring 71 which rotates the pawl latch 96 to engage the sliding member 200. The pawl latch 96 attaches to the lock cable 84. The lock cable 84 selectively unlocks the pawl latch 96 from the sliding member 200 to selectively actuate the linkage assembly 70. Selective actuation of the linkage assembly 70 selectively configures the garment bag 20 between the tote configuration and the fully folded configuration.

It can be appreciated that when the end 82 of the lifting mechanism 55 is pulled upwards in the direction of the arrow 80, as is done when the garment bag 20 is lifted and carried, the end 82 of the lifting mechanism 55 tensions the cable 76. The cable 76, in turn, pulls the sliding member 200 upwards in the direction of the arrow 80. As the sliding member 200 slides upwards, the pawl latch 96 rotates to permit the sliding member 200 to slide, and then the spring 71 counter-rotates the pawl latch 96 to automatically lock against the sliding member 200 to lock the garment bag 20 in the fully folded configuration.

With particular reference to FIG. 12, the garment bag 20 is shown in a tote configuration. The garment bag 20 has two ends 222 and 224. The tote configuration is particularly suited for standing the garment bag upright with the handle 58 facing upwards. The tote configuration is also suited for rolling the garment bag 20 on the wheels 74. The tote configuration is achieved when the garment bag 20 is partially folded between the fully folded configuration and the open configuration to stabilize the garment bag 20.

The garment bag 20 unfolds from the fully folded configuration (FIG. 11 ) to the tote configuration in response to actuation of the actuator 86. The actuator 86 attaches to the lock cable 84. The lock cable 84 attaches to the pawl latch 96. When the actuator is actuated, the lock cable 84 tensions and counter rotates the pawl latch 96. Counter rotation of the pawl latch 96 releases the sliding member 200 and automatically configures the garment bag 20 from the fully folded configuration to the tote configuration.

The spring 98 is a helical spring which aligns in parallel with the slot 208 and the cable 76. The spring 98 draws the sliding member 200 downward in the direction of the arrow 215 along the slot 208 to unfold the garment bag 20 from the fully folded configuration to the tote configuration. Although the spring is a helical spring, various types of urging mechanisms can be used in accordance with the present invention to actuate the linkage assembly via a sliding or moveable member.

Downward motion of the sliding member 200 draws the transverse member 202 from a parallel position (FIG. 11) through a diagonal position with respect to the slot 208. The rotatable member 204 rotates to provide structural support to the transverse member 202. The spring 98 biases the garment bag in the tote configuration. Although the linkage assembly 70 has several rigid structural members, linkages having a lesser, or greater, number of structural components can be employed in accordance with the present invention.

The wheels 74 attach with the linkage assembly 70 at each end 222 and 224 of the garment bag 20. The wheels 74 normally lie flush with the garment bag 20 and extend from the garment bag 20 to lock in an operable position in response to the linkage assembly 70 when the garment bag 20 occupies the tote configuration.

In an alternate embodiment, wheels are rigidly mounted on the garment bag 20 (see FIGS. 7 and 8). The garment bag 20 has beveled ends which partially conceal the wheels 172 when the garment bag 20 is in the fully folded configuration (FIG. 8).

The release 206 is manually actuatable and includes a pin 216 and a tab 218. The garment bag 20 defines a connector 220. The pin 216 removeably pokes into the connector 220 of the garment bag 20. The tab 218 locks the pin 216 with the connector 220 as shown in FIG. 12. The tab 218 is manually moveable to unlock the pin 216 to permit the pin 216 to withdraw from the connector 220. When the pin 216 withdraws from the connector 220, the linkage assembly can be folded to lock with the latch 96 and the garment bag 20 can unfold into an open or flat configuration. When the pin 216 is withdrawn from the connector 220, the linkage assembly can be folded as shown in FIG. 11 either by directly urging the transverse member 202 or by pulling the lifting mechanism 50.

It should further be apparent to those skilled in the art that various changes in form and details of the invention as shown and described may be made. It is intended that such changes be included within the spirit and scope of the claims appended hereto. For example, a garment bag can include a suitcase and a folding solid portion which is rotatably attached to the suitcase for providing a tote configuration.

I claim:

1. A garment bag, comprising:
   a garment bag being foldable between a tote configuration and a fully folded configuration;
   a lifting mechanism moveably attached to the garment bag, the lifting mechanism being capable of lifting the garment bag and folding the garment bag from the tote configuration to the fully folded configuration; and
   a linkage assembly having one end attached to the lifting mechanism and another end attached to the garment bag, wherein the linkage assembly includes a sliding member, a cable and a spring, the cable attaches the sliding member to the lifting mechanism, the spring attaches the sliding member to the garment bag to bias the garment bag in the tote configuration whereby, when the lifting mechanism lifts the garment bag, one end of the lifting mechanism actuates the linkage assembly to fold the garment bag from the tote configuration into the fully folded configuration.

2. A garment bag, comprising:

a garment bag being foldable between a tote configuration and a fully folded configuration;

a lifting mechanism moveably attached to the garment bag, the lifting mechanism being capable of lifting the garment bag and folding the garment bag from the tote configuration to the fully folded configuration; and a linkage assembly having one end attached to the lifting mechanism and another end attached to the garment bag a lock mechanism for selectively actuating the linkage assembly wherein the lock mechanism includes an actuator, a lock cable and a spring biased pawl latch, the pawl latch is engageable with the linkage assembly, the actuator is selectively actuatable to selectively actuate the pawl latch to release the garment bag from the fully folded configuration to the tote configuration.

3. A garment bag, comprising:

a garment bag being foldable between a tote configuration and a fully folded configuration;

a lifting mechanism moveably attached to the garment bag, the lifting mechanism being capable of lifting the garment bag and folding the garment bag from the tote configuration to the fully folded configuration; and a linkage assembly having one end attached to the lifting mechanism and another end attached to the garment bag, wherein the linkage assembly includes a sliding member, a rotatable member, a transverse member having two ends and a middle portion, and a release, the sliding member attaches to one end of the transverse member, the rotatable member attaches to the middle portion of the transverse member, the release attaches to the other end of the transverse member, whereby when the lifting mechanism lifts the garment bag, one end of the lifting mechanism actuates the linkage assembly to fold the garment bag from the tote configuration into the fully folded configuration.

4. A garment bag, comprising:

a garment bag being foldable between a tote configuration and a fully folded configuration;

a lifting mechanism moveably attached to the garment bag, the lifting mechanism being capable of lifting the garment bag and folding the garment bag from the tote configuration to the fully folded configuration; and a linkage assembly having one end attached to the lifting mechanism and another end attached to the garment bag, the linkage assembly includes a release, the release is manually actuatable and includes a pin and a tab, the garment bag defines a connector, the pin removeably pokes into the connector of the garment bag, the tab selectively locks the pin with the connector, the tab is manually moveable to unlock the pin, the pin being configured to selectively withdraw from the connector, the linkage assembly is foldable, whereby, when the pin withdraws from the connector the linkage assembly folds, whereby when the lifting mechanism lifts the garment bag, one end of the lifting mechanism actuates the linkage assembly to fold the garment bag from the tote configuration into the fully folded configuration.

5. A foldable garment bag capable of assuming a tote configuration, comprising:

a garment bag being foldable between a tote configuration and a fully folded configuration;

a lifting mechanism moveably attached to the garment bag for lifting the garment bag and folding the garment bag from the tote configuration to the fully folded configuration; and a linkage assembly including a sliding member, a rotatable member, a transverse member having two ends and a middle portion, and a release, the sliding member attaches to one end of the transverse member, the rotatable member attaches to the middle portion of the transverse member, the release attaches to the other end of the transverse member, the sliding member being attached to the lifting mechanism, the transverse member, the rotatable member and the release being attached to the luggage cart, whereby, when the lifting mechanism lifts the garment bag, one end of the lifting mechanism actuates the linkage assembly to fold the garment bag from the tote configuration into the fully folded configuration.

6. A garment bag as set forth in claim 5, wherein the linkage assembly includes a helical spring, the helical spring attaches to the sliding member to bias the luggage cart in the tote configuration.

7. A garment bag as set forth in claim 5, wherein the luggage cart has wheels attached to the luggage cart, the wheels extend from a hidden position to an operational position when the garment bag folds from the fully folded configuration to the open configuration respectively.

8. A garment bag as set forth in claim 5, wherein the garment bag has a handle and a lock mechanism, the lock mechanism has a rotatable actuator attached to the garment bag adjacent the handle, the lock mechanism attaches to the linkage assembly to selectively lock the linkage assembly.

9. A garment bag as set forth in claim 5, wherein the linkage assembly has a spring attached to the sliding member and a slot, the spring is a helical spring which aligns in parallel with the slot, whereby, when the spring draws the sliding member along the slot, the linkage assembly unfolds the garment bag from the fully folded configuration to the tote configuration.

10. A garment bag as set forth in claim 5, wherein the rotatable member rotatably attaches to the luggage cart and the sliding member slidably attaches to the luggage cart.

11. A garment bag as set forth in claim 5, wherein the garment bag includes a coaxial cable, the cable attaches the sliding member to the lifting mechanism.

12. A garment bag as set forth in claim 5, wherein the garment bag includes a lock assembly, the lock assembly includes a spring biased pawl latch, the pawl latch selectively locks the linkage assembly.

13. A garment bag as set forth in claim 5, wherein the linkage assembly includes a spring, the spring attaches to the sliding member to bias the garment bag in the tote configuration.

* * * * *